United States Patent [19]
Nakamura et al.

[11] Patent Number: 5,056,903
[45] Date of Patent: Oct. 15, 1991

[54] LENS BARREL STRUCTURE FOR WATERPROOF CAMERA

[75] Inventors: Ikushi Nakamura; Shigeru Nagata, both of Osaka, Japan

[73] Assignee: Minolta Camera Kabushiki Kaisha, Osaka, Japan

[21] Appl. No.: 330,134

[22] Filed: Mar. 29, 1989

[30] Foreign Application Priority Data

Mar. 31, 1988 [JP] Japan .................. 63-76512

[51] Int. Cl.⁵ .............. G02B 7/02; G02B 15/00; G03B 17/08; G03B 17/04
[52] U.S. Cl. .................. 359/513; 354/64; 354/187; 359/825; 359/704
[58] Field of Search .............. 350/577–589, 350/245–257, 429; 354/64, 83, 158, 187, 193–194

[56] References Cited

U.S. PATENT DOCUMENTS

| | | | |
|---|---|---|---|
| 3,877,047 | 4/1975 | Douglas | 354/193 |
| 4,289,390 | 9/1981 | Lermann et al. | 354/187 |
| 4,375,323 | 3/1983 | Inagaki et al. | 354/64 |
| 4,547,053 | 10/1985 | Tobler | 354/187 |
| 4,662,734 | 5/1987 | Nishi | 354/187 |
| 4,666,274 | 5/1987 | Maeno et al. | 354/64 |
| 4,763,145 | 8/1988 | Takamura et al. | 354/64 |

FOREIGN PATENT DOCUMENTS

| | | |
|---|---|---|
| 55-67735 | 5/1980 | Japan . |
| 55-127541 | 10/1980 | Japan . |
| 55-95121 | 12/1980 | Japan . |
| 56-13232 | 7/1981 | Japan . |
| 59-12164 | 3/1984 | Japan . |
| 60-82683 | 6/1985 | Japan . |
| 60-100739 | 7/1985 | Japan . |
| 62-170925 | 10/1987 | Japan . |
| 62-170926 | 10/1987 | Japan . |
| 255927 | 11/1987 | Japan .................. 354/64 |

Primary Examiner—Bruce Y. Arnold
Assistant Examiner—Thong Nguyen
Attorney, Agent, or Firm—Willian Brinks Olds Hofer Gilson & Lione

[57] ABSTRACT

A lens barrel for a waterproof or dustproof camera which can assure maintenance of a reliable liquid-tight or airtight condition between a movable lens barrel member and a fixed lens barrel member with a structure of a comparatively small size. The lens barrel comprises a fixed lens barrel member provided on a camera body, a movable lens barrel member mounted for movement on the fixed member between a position advanced outwardly from the camera body and another position retracted in the camera body, and a bellows member secured at an end thereof to an inner periphery of a rear portion of the movable member and at the other thereof to an inner periphery of a rear portion of the fixed member. The bellows member is folded back at an intermediate portion thereof between the movable member and the fixed member in such a manner as to surround a rear end of the movable member, and the folded back portion moves as the movable member is moved between the retracted position and the advanced position.

8 Claims, 6 Drawing Sheets

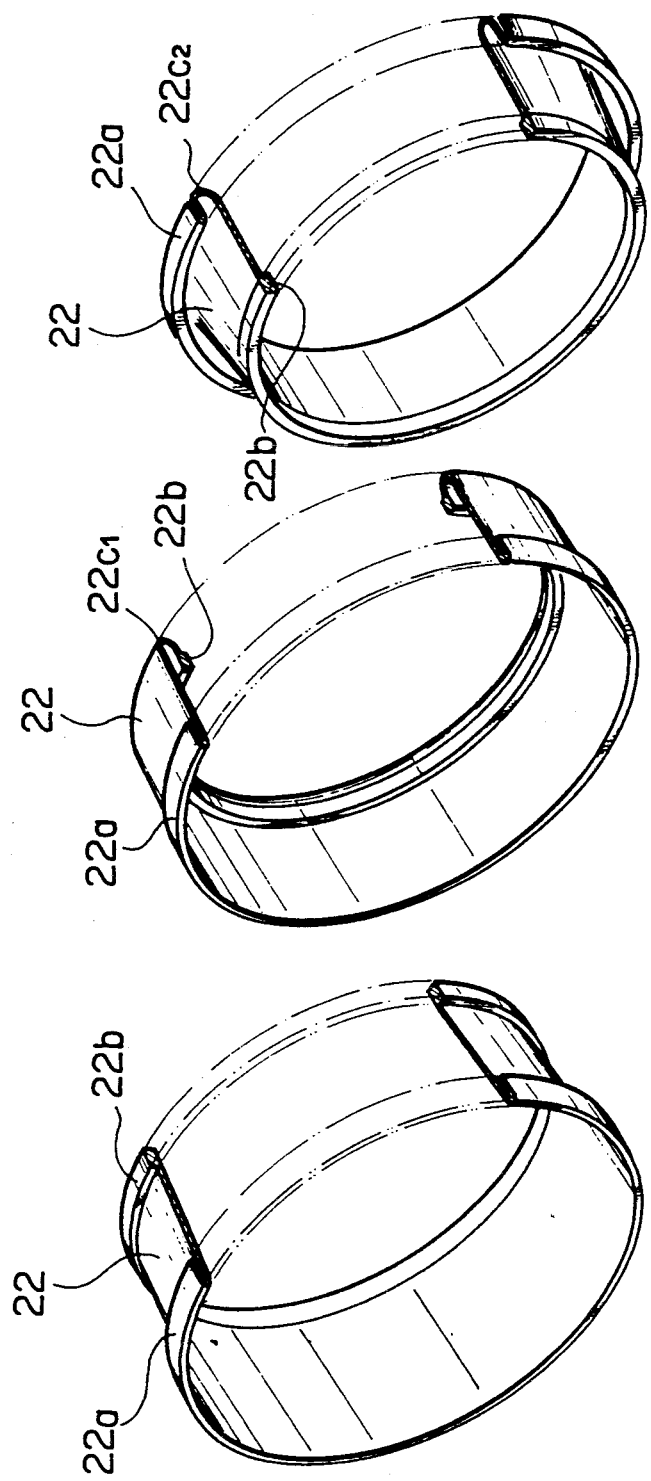

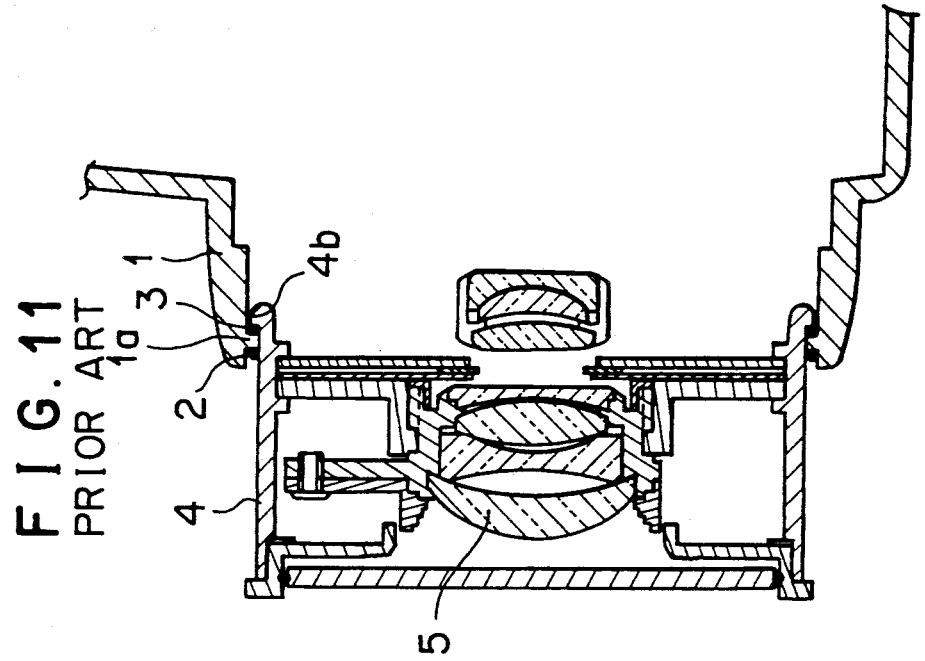
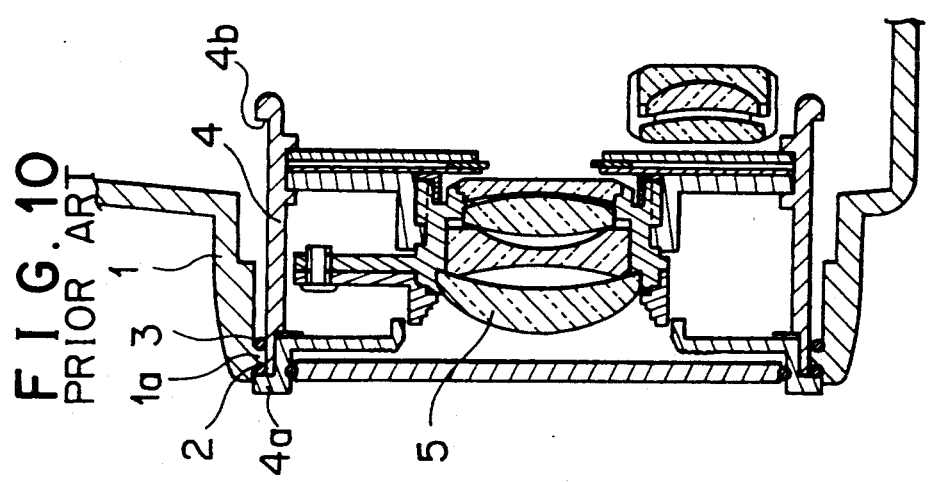

ns,903

LENS BARREL STRUCTURE FOR WATERPROOF CAMERA

BACKGROUND OF THE INVENTION

1. Field of the Invention

This invention relates to a waterproof structure of a lens barrel of a camera wherein a movable lens barrel member is designed to move forwardly and backwardly over a comparatively large distance such as a lens barrel of a two-focal length change-over lens, a zoom lens or a collapsible mount type lens.

2. Description of the Prior Art

A waterproof camera conventionally employs, as a waterproof or dustproof structure of a movable lens barrel, an O-ring or a fold type bellows.

An exemplary one of conventional waterproof structures which employ an O-ring is shown in FIGS. 10 and 11. Referring to FIGS. 10 and 11, a fixed lens barrel member 1 is secured to a body of a camera not shown, and a movable lens barrel member 4 having a main lens 5 carried therein is disposed in the fixed lens barrel member 1 for sliding movement in the direction of an optical axis of the main lens 5.

A pair of O-rings 2 and 3 are mounted on front and rear faces of an annular rib 1a formed on an inner face at a front end portion of the fixed lens barrel member 1. In a condition shown in FIG. 10 wherein the movable lens barrel member 4 is accommodated in the fixed lens barrel member 1, that is, in a wide angle photographing or collapsed condition, the O-ring 2 on the front face of the annular rib 1a of the fixed lens barrel member 1 contacts with an annular rib or flange 4a formed at the front end of the movable lens barrel member 4 to establish a liquid-tight condition. To the contrary, in another condition shown in FIG. 11 wherein the movable lens barrel member 4 is advanced or projected forwardly from the fixed lens barrel member 1, that is, in a tele-photographing or non-collapsed condition, the other O-ring 3 on the rear face of the annular rib 1a of the fixed lens barrel member 1 contacts with another annular rib or flange 4b formed at the rear end of the movable lens barrel member 1 to establish a liquid-tight condition.

An exemplary one of conventional waterproof structures which employ a fold type bellows is shown in FIGS. 12 and 13. Referring to FIGS. 12 and 13, a fold type bellows 12 made of a material which can maintain a liquid-tight condition such as rubber or rubber-coated cloth is connected at a rear end thereof to an annular rib 11a formed at a rear end portion of a fixed lens barrel member 11 and at the other front end thereof to an annular rib or flange 14a formed at the front end of a movable lens barrel member 14. When the movable lens barrel member 14 is retracted to a wide angle photographing or collapsed position as shown in FIG. 12, the fold type bellows 12 is accommodated in a folded condition in a spacing formed by and between the annular rib 11a at the rear portion of the fixed lens barrel member 11 and the annular flange 14a at the front end of the movable lens barrel member 14 as seen in FIG. 12. To the contrary, when the movable lens barrel member 14 is projected to a tele-photographing or non-collapsed position as shown in FIG. 13, the fold type bellows 12 is extended following the movement of the movable lens barrel member 14. The fold type bellows 12 thus maintains the liquid-tight condition between the fixed lens barrel member 11 and the movable lens barrel member 14 in this manner.

The former conventional waterproof structure which employs an O-ring has a drawback that, when the movable lens barrel member is at an intermediate position between the fully retracted position and the fully advanced position, the liquid-tight condition thereof cannot be maintained because the O-rings do not contact sufficiently with the movable lens barrel member.

It may seem recommendable, in order to maintain the liquid-tight condition at any intermediate position of the movable lens barrel member of the waterproof structure, to continuously apply a pressure so as to normally contact an outer periphery of the movable lens barrel member 4 with an inner periphery of the fixed lens barrel member 1. In this instance, however, such pressure makes a high load to the movable lens barrel member 4 when the movable lens barrel member 4 moves forwardly or backwardly. Accordingly, there is a drawback that a motor of large size and a power source of a large capacity are required, which will lead to an increase in overall size of the camera.

To the contrary, the latter conventional waterproof structure which employs a fold type bellows requires, between the movable lens barrel member 14 and the fixed lens barrel member 11, a spacing for accommodating the folded bellows 12 therein. Accordingly, there is a drawback that the fixed lens barrel member 11 is required to have an increased size, which also leads to an increase in overall size of the camera.

SUMMARY OF THE INVENTION

It is an object of the present invention to provide a lens barrel for a waterproof or dustproof camera which can assure maintenance of a reliable liquid-tight or airtight condition between a movable lens barrel member and a fixed lens barrel member.

It is another object of the present invention to provide a lens barrel for a waterproof or dustproof camera wherein a liquid-tight or airtight condition can be attained with a structure of a comparatively small size.

In order to attain the objects, according to the present invention, there is provided a lens barrel for a camera which comprises a fixed member provided on a body of the camera, a movable member having at least a part of an optical system of the camera carried thereon and mounted for movement on and with respect to the fixed member between a first position advanced outwardly from the camera body and a second position retracted in the camera body, and a bellows member secured at an end thereof to an inner periphery of a rear portion of the movable member and at the other thereof to an inner periphery of a rear portion of the fixed member, the bellows member being folded back at an intermediate portion thereof between the movable member and the fixed member in such a manner as to surround a rear end of the movable member.

With the above-mentioned structure, when the movable member is at the second or retracted position, the bellows member serving as a watertight means has the intermediate folded back portion thereof positioned around the rear end of the movable member near a position at which the bellows member is mounted on the movable member. Then, as the movable member is moved from the retracted position to the first or advanced position, the folded back portion of the bellows member gradually moves to a position at which the bellows member is mounted on the fixed member, and the bellows member is positioned in a spacing from which the movable member has advanced. When the movable member is moved reversely from the advanced position to the retracted position, the bellows member moves in the reverse operation. In this manner, the watertight means requires no special or additional spacing for disposition thereof and assures smooth movement of the movable member between the advanced and retracted positions while maintaining a reliable watertight or airtight condition. Besides, the watertight means does not apply such a high load to the movable member upon movement between the advanced and retracted positions that may be applied in a conventional lens barrel wherein an O-ring is employed as a watertight means, and accordingly, the power required for movement of the movable member between the advanced and retracted positions can be reduced and the lens barrel can be reduced in overall size.

The above and other objects, features and advantages of the present invention will become apparent from the following description and the appended claims, taken in conjunction with the accompanying drawings.

BRIEF DESCRIPTION OF THE DRAWINGS

FIG. 3 is a perspective view of a fold back type bellows of the lens barrel of FIG. 1 in an unfolded condition before they are mounted on the lens barrel:

FIG. 4 is a similar view but showing the fold back type bellows of FIG. 3 in a folded back condition when the lens barrel of FIG. 1 is at the wide photographing position;

FIG. 5 is a similar view but showing the fold back type bellows of FIG. 3 in another folded back condition when the lens barrel of FIG. 1 is at the tele-photographing position;

FIGS. 10 and 11 are sectional views showing a conventional lens barrel employing an O-ring when the lens barrel is in a wide angle photographing condition and a tele-photographing condition, respectively.

DETAILED DESCRIPTION OF THE PREFERRED EMBODIMENT

Figure 2:
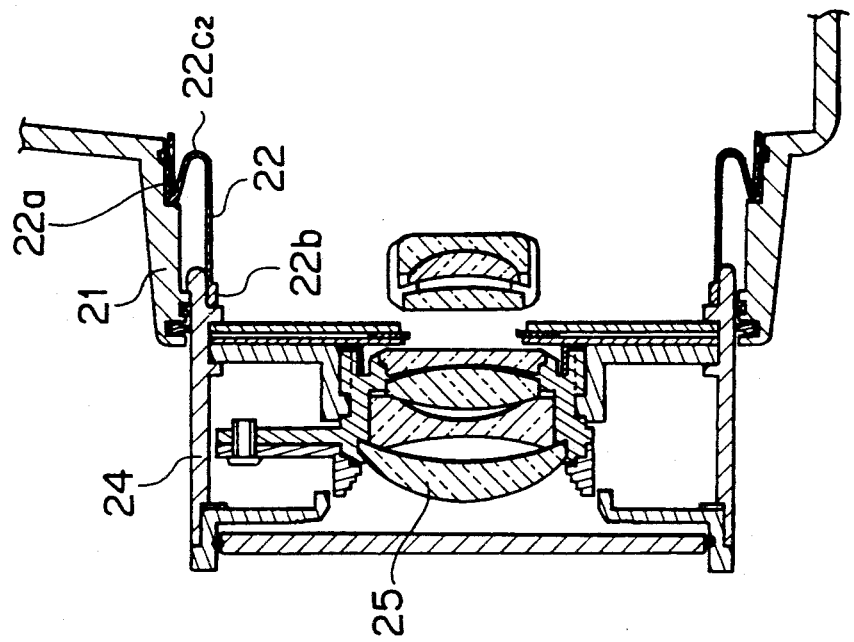
FIG. 2 is a similar view but showing the lens barrel of FIG. 1 at a tele-photographing (advanced) position.
Figure 1:
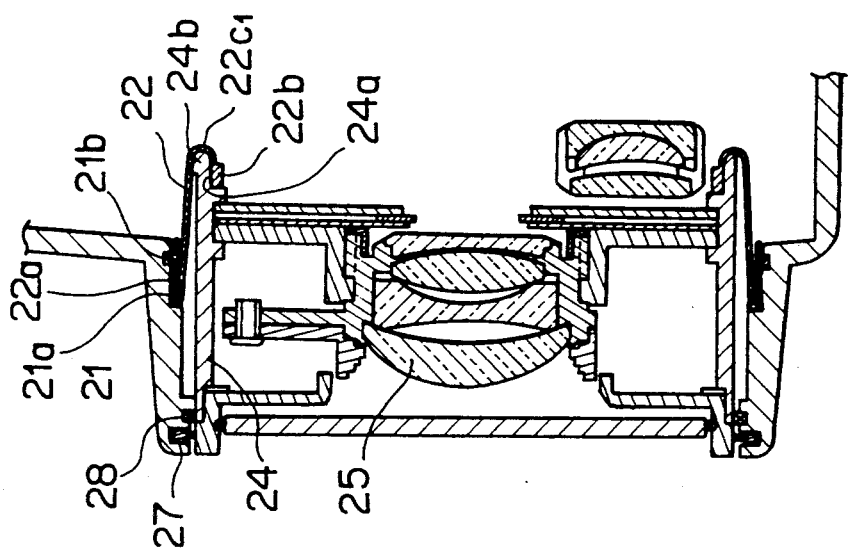
FIG. 1 is a sectional view of a lens barrel at a wide angle photographing (retracted) position showing an embodiment of the present invention.

Referring first to FIGS. 1 and 2, there is shown a waterproof camera in which a lens barrel according to the present invention is incorporated. The waterproof camera is of the type having a two-focal length changeover lens wherein the focal length range can be changed over between a wide angle photographing range and a tele-photographing range. The lens barrel of the camera shown includes such a fold back type bellows 22 as particularly shown in FIGS. 3 to 5. In FIG. 3, the bellows 22 is shown in perspective view in an extended condition before it is secured to a fixed lens barrel member side and a movable lens barrel member side of the waterproof camera. In the condition shown in FIG. 3, the bellows 22 is not folded back at an intermediate portion thereof. To the contrary, in FIGS. 4 and 5, the bellows 22 is shown in different conditions when the fixed lens barrel member side and the movable lens barrel member side to which the bellows 22 is secured are positioned at different positions relative to each other and the bellows 22 is folded back at an intermediate portion thereof.

In particular, referring to FIGS. 1 and 2, the bellows 22 has an end portion 22a secured to an inner periphery 21a of a rear portion of a fixed lens barrel member 21 of the camera and the other end portion 22b secured to an inner periphery 24a of a rear portion of a movable lens barrel member 24 of the camera in which a main lens 25 is supported. The bellows 22 is folded back at an intermediate portion 22c (specifically denoted at 22c1 and 22c2 in FIGS. 1 and 4 and in FIGS. 2 and 5, respectively) thereof between the inner periphery 21a of the rear portion of the fixed lens barrel member 21 and the inner periphery 24a of the rear portion of the movable lens barrel member 24. The folded back portion 22c of the bellows 22 varies in accordance with a position of the movable lens barrel member 24 relative to the fixed lens barrel member 21. When the movable lens barrel member 24 is positioned at a wide angle photographing position at which the movable lens barrel member 24 is retracted in the fixed lens barrel member 21 as shown in FIG. 1, the folded portion 22c1 of the bellows 22 is positioned in contact with a rear end portion 24b of the movable lens barrel member 24. As the movable lens barrel member 24 is advanced or projected outwardly from the wide angle photographing position in the the fixed lens barrel member 21 to a tele-photographing position thereof shown in FIG. 2, the folded back portion 22c of the bellows 22 is gradually spaced from the rear end portion 24b of the movable lens barrel member 24 and moves toward the inner periphery 21a of the rear portion of the fixed lens barrel member 21 at which the end portion 22a of the bellows 22 is secured to the fixed lens barrel member 21. Thus, the folded back portion 22c of the bellows 22 finally comes to a position near the end portion 22a of the bellows 22 as seen in FIGS. 2 and 5.

Figure 6:
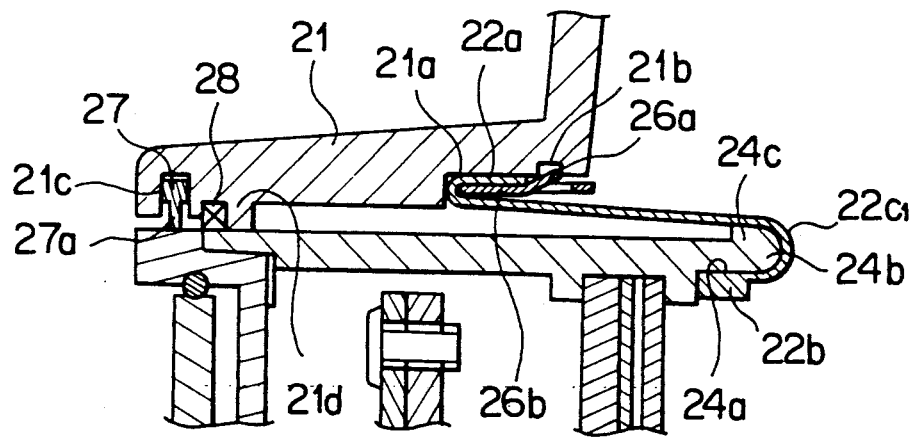
FIGS. 6 and 7 are enlarged partial sectional views of similar part of the lens barrel shown in FIGS. 1 and 2, respectively.
Figure 7:
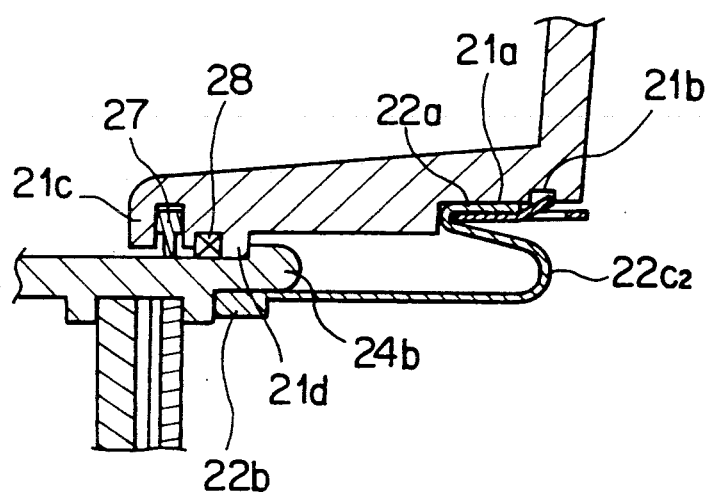

Referring to FIGS. 6 and 7, the bellows 22 extending between the fixed lens barrel member 21 and the movable lens barrel member 24 is shown in an enlarged scale when the movable lens barrel member 24 is at the wide angle photographing position and the telephotographing position shown in FIGS. 1 and 2, respectively.

Figure 8:
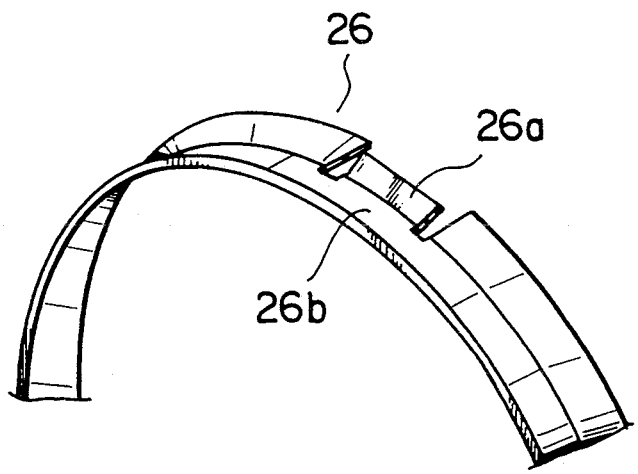
FIG. 8 is a perspective view showing part of a bellows securing member for securing the bellows of FIG. 1 to a fixed lens barrel member shown in FIG. 1.

In order to secure the rear end portion 22a of the bellows 22 to the fixed lens barrel member 21, such an annular bellows securing member 26 as shown in FIG. 8 is used. The annular bellows securing member 26 has a major cylindrical portion 26b adapted to be inserted into the inner periphery of the rear end portion 21a of the fixed lens barrel member 21 and cooperate, in its fully inserted position, with the rear end portion 21a of the fixed lens barrel member 21 to hold the end portion 22a of the bellows 22 therebetween. The bellows securing member 26 further has a plurality of, say, 3 or 4, pawls 26a formed rearwardly on the cylindrical portion 26b thereof. The pawls 26a of the bellows securing member 26 are bent rather radially outwardly as seen in FIG. 8. The pawls 26a of the annular bellows securing member 26 are fitted individually in a plurality of recesses 21b formed in an inner circumferential wall near the rear end of the fixed lens barrel member 21 to prevent the bellows securing member 26 from coming off in the rearward direction from the fixed lens barrel member 21.

In assembly, the end portion 22a of the bellows 22 is wrapped around the cylindrical portion 26b of the bellows securing member 26, and then the bellows securing member 26 is inserted into the inner periphery of the rear end portion 21a of the fixed lens barrel member 21 from the rear side whereupon the pawls 26a thereon are resiliently yielded and fitted into the recesses 21b of the fixed lens barrel member 21 to restore its original configuration. In this condition, the end portion 22a of the bellows 22 is securely retained in position due to a resilient pressure holding function of the cylindrical portion 26b of the bellows securing member 26 and also to a coming off preventing function of the recesses 21b of the fixed lens barrel member 21 cooperating with the pawls 26a of the bellows securing member 26.

An annular lip packing 27 and a teremp or plush packing 28 are provided at a forward end portion of the fixed lens barrel member 21 for preventing sand, dust or some other foreign articles than water from entering the inside of the camera by way of a gap between the fixed lens barrel member 21 and an outer periphery of the movable lens barrel member 24.

The lip packing 27 is fitted in an annular groove 21c formed on an inner wall of the front end portion of the fixed lens barrel member 21. The lip packing 27 has a resilient tongue-like projection 27a formed thereon and extending to the outer periphery of the movable lens barrel member 21. The resilient tongue-like projection 27a of the lip packing 27 has an inner diameter a little smaller than the outer diameter of the movable lens barrel member 24 so that the inner end thereof may be held in normal sliding contact with the outer periphery of the movable fixed barrel member 24 when the movable lens barrel member 24 is advanced out of or retracted into the fixed lens barrel member 21. The lip packing 27 can prevent comparatively large sands or the like from entering the inside of the camera. In this instance, an additional lip packing may be provided.

The teremp packing 28 is provided on the inner periphery of the fixed lens barrel member 21 adjacent the lip packing 27 and has a large number of fine projections or fibers provided in a juxtaposed relationship as in a flocked fabric so that it can prevent entry of comparatively small dust or the like which has passed the lip packing 27.

Figure 9:
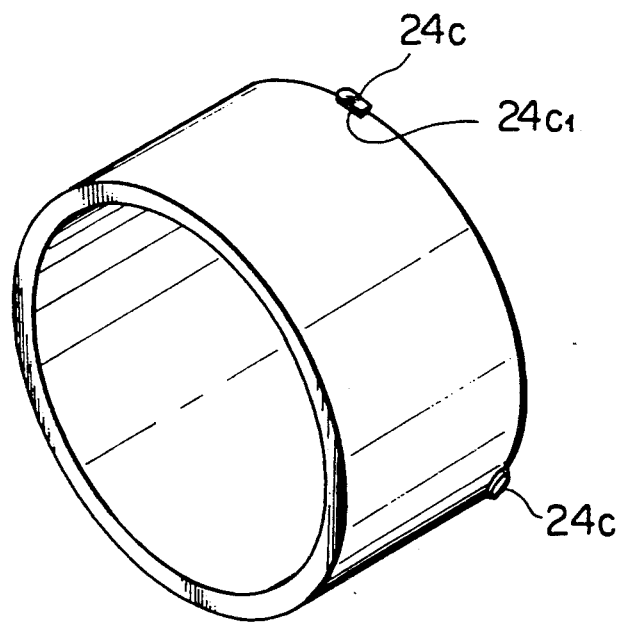
FIG. 9 is a perspective view showing a positioning projection of a movable lens barrel member shown in FIG. 1.
Figure 13:
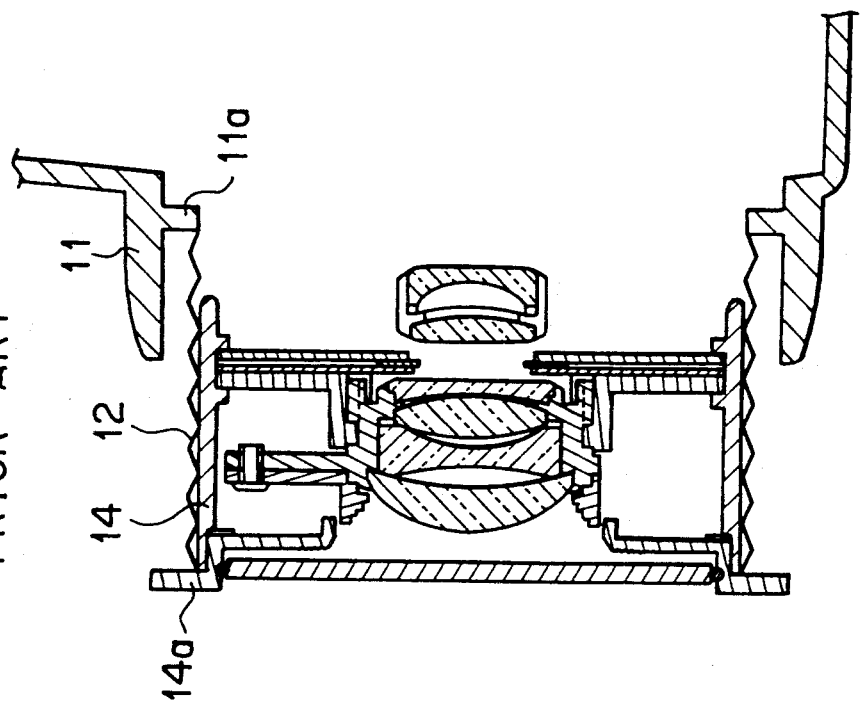
FIGS. 12 and 13 are sectional views showing a conventional lens barrel employing a fold type bellows when the lens barrel is in a wide angle photographing condition and a tele-photographing condition, respectively.
Figure 12:
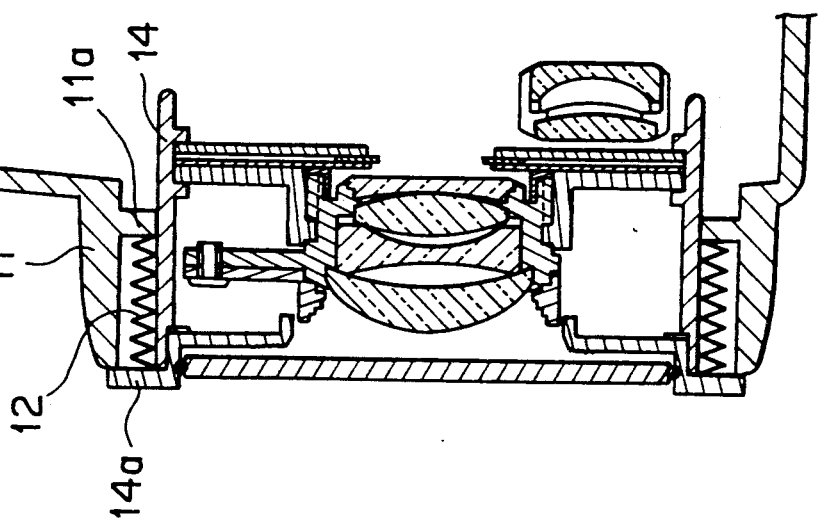

An annular limiting projection or rib 21d is formed on the inner periphery of the front end portion of the fixed lens barrel member 21 adjacent the teremp packing 28 such that it may engage with three positioning projections 24c shown in FIG. 9 formed on the outer periphery of the rear end of the movable lens barrel member 24 to limit the forwardly advanced position of the movable lens barrel member 24. Each of the positioning projections 24c is rounded at a front face 24c1 thereof at which it contacts with the limiting projection 21d of the fixed lens barrier member 21 in order to minimize the contacting area thereof with the limiting projection 21d. Such minimization of the contacting area is effective to reduce the possibility that dust or the like which should enter the inside of the camera without being successfully prevented by either of the packing members 27 and 28 may stick to the contacting faces 24c1 of the movable lens barrel member 24 to deteriorate the accuracy of the advanced position of the movable lens barrel member 24.

Meanwhile, where the bellows 22 has a smaller thickness at an intermediate portion thereof than at the opposite secured end portions thereof so that they may be accommodated to a change in pressure in a spacing defined by the fixed lens barrel member 21, the movable lens barrel member 24 and the bellows 22, a change in volume of the inside of the camera can be compensated for by elongation or contraction of the bellows 22.

As described above, according to the embodiment of the present invention, the lens barrel for a camera comprises the fixed member 21 provided on the body of the camera, the movable member 24 having at least part 25 of an optical system of the camera carried thereon and mounted for movement on and with respect to the fixed member 21 between a first position advanced outwardly from the camera body and a second position retracted in the camera body, and the bellows member 22 secured at the end thereof to the inner periphery 24a of the rear portion of the movable member 24 and at the other thereof to the inner periphery 21a of the rear portion of the fixed member 21, the bellows member 22 being folded back at an intermediate portion 22c thereof between the movable member 24 and the fixed member 21 in such a manner as to surround the rear end 24b of the movable member 24. With the lens barrel, the movable member can make smooth movement from the retracted position to the advanced position or reversely from the advanced position to the retracted position, and the bellows member serving as a watertight means can maintain a reliable liquid-tight condition thereof without requiring a specific or additional spacing therefor.

It is to be noted that, while the camera in the embodiment described hereinabove is a waterproof camera and the bellows has a watertight performance, it may otherwise be a dust-proof camera, and in such an instance, the bellows is only required to prevent entry of dust into the inside of the camera. Meanwhile, if such bellows is formed from a light intercepting material, stray light which may otherwise enter the inside of the camera can be eliminated without the necessity of employment of a complicated light intercepting structure.

Having now fully described the invention, it will be apparent to one of ordinary skill in the art that many changes and modifications can be made thereto without departing from the spirit and scope of the invention as set forth herein.

What is claimed is:

1. A lens barrel for a camera, comprising:
    a fixed barrel provided on a body of said camera;
    a movable barrel having at least a part of an optical system of said camera carried thereon and fitted for movement inside said fixed barrel between a first position advanced outwardly from said camera body and a second position retracted into said camera body; and
    a bellows member of a tube shape secured at a whole end thereof to a periphery of a rear portion of said movable barrel so as to extend rearwardly therefrom and at the other whole end thereof to an inner periphery of a rear portion of said fixed barrel so as to extend rearwardly therefrom, said bellows member being folded back at an intermediate portion thereof in such a manner that said bellows member surrounds a rear end of said movable barrel when said movable barrel is in said second position.

2. A lens barrel for a camera as claimed in claim 1, wherein said camera is a waterproof camera and said bellows member comprises a waterproof bellows member, and wherein said ends of said waterproof bellows member are secured to said movable and fixed barrels in a watertight manner.

3. A lens barrel for a camera as claimed in claim 1, wherein said camera is a dustproof camera and said bellows member comprises a dustproof bellows member, and wherein said ends of said dustproof bellows member are secured to said movable and fixed barrels in a dust-tight manner.

4. A lens barrel for a camera as claimed in claim 1, wherein said bellows member is formed of a light intercepting material for preventing stray light from entering into said camera.

5. A lens barrel for a camera, comprising;
a fixed barrel provided on a body of said camera;
a movable barrel having at least a part of an optical system of said camera carried thereon and fitted for movement on and with respect to said fixed barrel between a first position advanced outwardly from said camera body and a second position retracted into said camera body; and
a bellows member of a tube shape secured at a whole end thereof to a periphery of a rear portion of said movable barrel so as to extend rearwardly therefrom and at the other whole end thereof to a periphery of a rear portion of said fixed barrel so as to extend rearwardly therefrom, said bellows member being folded back at an intermediate portion thereof.

6. A lens barrel for a camera as claimed in claim 5 wherein said camera is a waterproof camera and said bellows member comprises a waterproof bellows member, and wherein said ends of said waterproof bellows member are secured to said movable and fixed barrels in a watertight manner.

7. A lens barrel for a camera as claimed in claim 5 wherein said camera is a dustproof camera and said bellows member comprises a dustproof bellows member, and wherein said ends of said dustproof bellows member are secured to said movable and fixed barrels in a dust-tight manner.

8. A lens barrel for a camera as claimed in claim 4 wherein said bellows member is formed of a light intercepting material for preventing stray light from entering into said camera.

* * * * *

UNITED STATES PATENT AND TRADEMARK OFFICE
CERTIFICATE OF CORRECTION

PATENT NO. : 5,056,903

DATED : October 15, 1991

INVENTOR(S) : Ikushi Nakamura, et al.

It is certified that error appears in the above-identified patent and that said Letters Patent is hereby corrected as shown below:

In col. 3, line 27, change ":" (colon) to --;-- (semi-colon).

In col. 3, line 33, change ":" (colon) to --;-- (semi-colon).

In col. 6, line 67 (claim 1, line 14), change "thereform" to --therefrom--.

In col. 7, line 21 (claim 5, line 1), change ";" (semi-colon) to --:-- (colon).

In col. 8, line 23 (claim 8, line 1), change "4" to --5--.

Signed and Sealed this

Second Day of March, 1993

Attest:

STEPHEN G. KUNIN

Attesting Officer

Acting Commissioner of Patents and Trademarks